US008654251B2

(12) United States Patent
Azzopardi (10) Patent No.: US 8,654,251 B2
(45) Date of Patent: Feb. 18, 2014

(54) METHOD AND APPARATUS FOR GENERATING AND TRANSMITTING SYNCHRONIZED VIDEO DATA

(75) Inventor: Marc Anthony Azzopardi, San Gwann (MT)

(73) Assignee: University of Malta (MT)

( * ) Notice: Subject to any disclaimer, the term of this patent is extended or adjusted under 35 U.S.C. 154(b) by 37 days.

(21) Appl. No.: 13/063,315

(22) PCT Filed: Sep. 7, 2009

(86) PCT No.: PCT/EP2009/061553
§ 371 (c)(1),
(2), (4) Date: Mar. 10, 2011

(87) PCT Pub. No.: WO2010/029040
PCT Pub. Date: Mar. 18, 2010

(65) Prior Publication Data
US 2011/0242413 A1    Oct. 6, 2011

(30) Foreign Application Priority Data

Sep. 11, 2008 (MT) .......................................... 4230

(51) Int. Cl.
*H04N 9/475* (2006.01)
*H04N 13/02* (2006.01)
*G06T 13/00* (2011.01)

(52) U.S. Cl.
USPC .............. 348/512; 348/47; 345/474; 345/475

(58) Field of Classification Search
None
See application file for complete search history.

(56) References Cited

U.S. PATENT DOCUMENTS 5,307,168 A    4/1994  Tashiro
5,572,261 A *  11/1996 Cooper .......................... 348/512

(Continued)

FOREIGN PATENT DOCUMENTS

| EP | 1684531 A2   | 7/2006 |
|---|---|---|
| JP | 2001069530 A | 3/2001 |

(Continued)

OTHER PUBLICATIONS

Azzopardi et al. "A high speed tri-vision system for automotive applications." European Transport Research Review. Published online Feb. 3, 2010.

(Continued)

*Primary Examiner* — Jefferey Harold
*Assistant Examiner* — Sean Haiem
(74) *Attorney, Agent, or Firm* — Harness, Dickey & Pierce, P.L.C.

(57) ABSTRACT

Problem. Current systems for generating synchronized video sequences from multiple video sources are too complex, too restrictive, too cumbersome or too imprecise. There are also few practical ways of faithfully transmitting highly synchronized multivideo between video sources and video sinks. Solution. A system and a method for ensuring precise synchronization of high speed stereovision or multivision systems is disclosed. This method involves the use of matched video sources such as cameras or image sensors which are subjected to a common clock as well as identical operating conditions thereby guaranteeing an identical internal state and synchronized output timing behaviour without relying on the provision of a frame reset pulse or a line reset pulse generated by any one of the video sources in order to guarantee synchronization. This avoids the delays associated with the transmission of such pulses and hence allows much higher frames rates to be achieved. In addition, a system and a method for transferring multivideo, and enabled by the use of highly synchronized video produced by the previously mentioned method, are disclosed. This allows the combined and faithful transmission of the synchronized outputs of a plurality of matched video sources over a single digital interface such as Camera-Link®. In the latter embodiment, this method extends, without violating, the provisions for multi-tap video as laid out in the Camera-Link® specification.

8 Claims, 4 Drawing Sheets

(56) References Cited

U.S. PATENT DOCUMENTS

| | | | |
|---|---|---|---|
| 5,903,308 | A | 5/1999 | Cooper et al. |
| 5,995,140 | A | 11/1999 | Cooper et al. |
| 6,141,034 | A | 10/2000 | McCutchen |
| 6,340,991 | B1 | 1/2002 | Chen et al. |
| 6,950,121 | B2 | 9/2005 | Tserkovnyuk et al. |
| 7,411,604 | B2 | 8/2008 | Trinkel et al. |
| 7,511,764 | B2 | 3/2009 | Cooper et al. |
| 2001/0030682 | A1* | 10/2001 | Tserkovnyuk et al. ......... 348/47 |
| 2002/0190991 | A1* | 12/2002 | Efran et al. .................. 345/475 |
| 2004/0095585 | A1 | 5/2004 | Nayebi |
| 2004/0109586 | A1 | 6/2004 | Samson et al. |
| 2008/0001951 | A1* | 1/2008 | Marks et al. ................. 345/474 |

FOREIGN PATENT DOCUMENTS

| | | |
|---|---|---|
| JP | 2006203448 A | 8/2006 |
| JP | 2007060129 A | 3/2007 |
| JP | 2007104349 A | 4/2007 |
| WO | WO-2007 130691 A2 | 11/2007 |

OTHER PUBLICATIONS

M.A. Azzopardi. "Camera-Link and Synchronism in Automotive Multi-Vision Systems." Conference Proceedings, Fourth International Conference on Automotive Technologies, ICAT 2008. Istanbul, Turkey. vol. 1, Nov. 14, 2008. pp. 344-353.

"Camera Link Specification of the Camera Link Interface Standard for Digital Cameras and Frame Grabbers." Version 1.2. Jan. 2007.

Luhmann et al. "Synchronous 3-D High-Speed Camera with Stereo-Beam Splitting." SENSOR 2005 Conference. Nurnberg. May 2005.

Lin et al. "A case study in clock synchronization for distributed camera systems." Proceedings of SPIE—IS&T Electronic Imaging. SPIE vol. 5683. 2005.

Leslie Lamport. "Time, Clocks, and the Ordering of Events in a Distributed System." Communications of the ACM. vol. 21, No. 7. Jul. 1978. pp. 558-565.

Chang Hong Lin. "Design and Implementation of Distributed Real-Time Camera Systems." Princeton University. Mar. 2007.

Volker Graefe. "The BVV-Family of Robot Vision Systems." IEEE Workshop on Intelligent Motion Control. Istanbul. Aug. 1990.

"Camera Link Technology Brief." Basler Vision Technologies. Mar. 28, 2001.

M.A. Azzopardi. "Towards Camera-Link as an Automotive Video Bus: Enabling High Speed, Synchronised, Multivision Systems for Automotive Applications." Poster Presentation at the BMVA Symposium on Vision for Automotive Applications, British Machine Vision Association (BMVA), London, May 20, 2009.

Kenneth A. Laker et al. "Design of Analog Integrated Circuits and Systems." Jan. 1, 1994. McGraw-Hill Companies.

R. Jacob Baker et al. "CMOS Circuit Design, Layout, and Simulation." First Edition. Aug. 8, 1997. Wiley—IEEE Press.

Randall Geiger et al. VLSI Design Techniques for Analog and Digital Circuits. McGraw Hill International Editions. Electronic Engineering Series. Mar. 1989.

Phillip E. Allen et al. "CMOS Analog Circuit Design." Second Edition. Jan. 15, 2002. Oxford University Press.

* cited by examiner

METHOD AND APPARATUS FOR GENERATING AND TRANSMITTING SYNCHRONIZED VIDEO DATA

TECHNICAL FIELD

The present invention relates to stereovision or multivision systems, and more particularly to a technique used to economically generate and faithfully transmit synchronized video signals from a plurality of high-speed video sources, such as high-speed cameras, making up such stereovision or multivision systems.

BACKGROUND ART

The effective application of stereovision or multivision systems depends on the ability to generate and transmit (over a useful distance) synchronized stereovideo or multivideo signals from two or more cameras respectively. This problem is non-trivial and there have been numerous attempts to address it, as evidenced by the several related patents issued: U.S. Pat. Nos. 5,307,168, 5,903,308, 5,995,140, 6,340,991, 7,411,604, 6,950,121 and 7,511,764; Journal papers published: Lamport-1978, Lin-2005; Conference paper presented: Luhmann-2005 and finally a Princeton 2007 PhD dissertation by Chang Hong Lin, which are all hereby incorporated by reference.

Tashiro of Sony Electronics, Inc. describes in U.S. Pat. No. 5,307,168 an electro-mechanical means of synchronously controlling the mechanical shutter of two cameras. This is no longer applicable because today, most cameras on the market are digital cameras and in turn most of these use electronic shutters to sample the frames in a video sequence. An electro-mechanical synchronizing device would in any case be too slow for the multivision systems used in high speed applications.

Chen et al. of AT&T Corporation describe in U.S. Pat. No. 6,340,991 a way of using the motion of objects captured in video sequences by multiple cameras to calculate and compensate for the relative lag between the said video sequences. This avoids the need for explicit synchronization and shifts the problem to post processing. While this method is touted as a means of reducing costs, there are a number of scenarios where the net complexity and cost is increased by the need of an additional post processing step. Moreover, this technique is not universally applicable such as in cases where there is no motion in the captured sequences. This method of synchronization is additionally limited in the accuracy it can achieve since the resulting video sequences could still be misaligned by as much as half the inter-frame duration, on average.

Trinkel at al. of Deutsche Telekom AG describe in U.S. Pat. No. 7,411,604 a more general way of using cues artificially inserted into the recorded video sequences to measure and compensate for the relative lag between the said video sequences. In this case a modulated light signal (or audio signal) present in the field of view of both cameras is used provide a kind of time-stamp in the video sequences recorded by each. Although this method avoids the explicit need for motion in the captured sequences, it shares the remaining disadvantages of the method put forward by Chen et al. of AT&T, as described previously.

Cooper et al. of Ultrak, Inc. describe in U.S. Pat. No. 5,995,140 a system and a method which uses a pair of external synchronization signals produced by a video controller to directly control the vertical and horizontal synchronization between the cameras in a multivision system. However, in this system each camera possesses an independent oscillator to generate its own pixel clock. These oscillators are unlikely to operate in synchronism due to the absence of any mechanism that holds them in lockstep. The vertical and horizontal synchronizing signals are far too coarse to guarantee accurate pixel synchronization. Thus, while line and frame capture could be generally synchronized, the same cannot be affirmed at pixel level. This makes the system inadequate for synchronous digital transmission which requires perfect synchronization at every level.

Cooper at al. of Ultrak, Inc. have later described in U.S. Pat. No. 7,511,764 a method for generating synchronized digital video signals from a number of slave cameras connected to a master base unit. Although this system meets strict timing requirements, it does so in an unnecessarily complex way that makes it costly to implement. The slave cameras each posses their own oscillator and so does the master base unit. This, in turn, necessitates that the base unit adopts a store and forward mechanism to resynchronize the frames generated by the slave cameras. The base unit therefore requires a memory to temporarily store video data from each camera. This, not only adds complexity and cost, but also introduces a small but distinct delay in delivering the video data which may be a significant disadvantage for certain high speed applications.

In the system disclosed by Tserkovnyuk et al. in U.S. Pat. No. 6,950,121, a shared clock is used to guarantee electrical synchronization between a stereovision pair of analogue cameras. However, frame synchronization is only achieved by having one camera supply the other camera with a frame reset pulse. This defeats much of the advantage of using a shared clock since the delay incurred in transferring this signal from one camera to the next would result in a small but distinct difference in the timing behaviour of the two cameras. This problem grows as the distance between the cameras increases thereby posing serious limitations in the relative positioning of the cameras. In high speed video capture systems, this could impair the level of synchronization making it unfit for digital transmission.

Cooper et al. of Ultrak, Inc. describe in U.S. Pat. No. 5,903,308 a method that compensates for the delays caused by the transfer of synchronization pulses from one camera to the next. Although this method could offer a solution for cameras synchronized by such transfer of pulses, it would still be undesirable from the point of view of cost and complexity.

Lacking the knowledge of a simpler method for high synchronization, German vision experts Luhmann and Raguse from the IAPG and Volkswagen AG respectively went to the great length of using beam splitting optics (used in reverse) in order to guarantee the synchronicity of the multiple video sequences they wanted to capture-by using a single camera. This technique would by necessity, produce perfect synchronization between the two halves of the stereovision field of view, however, only at an exceptionally great expense. It is also exceedingly cumbersome and hardly applicable to the vast majority of applications which require a lightweight and portable stereovision or multivision implementation.

In 1978, Lamport analysed the problem of maintaining approximate clock synchronisation between distributed systems across a network. Lin in 2005 extended the concept to multiple distributed cameras and went on to write a PhD dissertation about it. However, all of these methods rely on the transfer of datagrams across a network and the synchronisation achievable is, of the order of tens of milliseconds and is also non-deterministic. For high speed applications this level of uncertainty would be unacceptable.

The foregoing description of prior art makes it amply clear that prior to the present invention, nobody, (whether ordinarily or extraordinarily), skilled in the art has been able to find an equivalent, simple, low-cost method for generating and transmitting precisely synchronized video from stereovision or multivision video sources such as camera systems. It follows, therefore, that the present invention is novel and non-obvious to anybody ordinarily skilled in the art.

SUMMARY OF INVENTION

In this invention, a method is presented which exploits the similarity of behaviour and performance of matched video-data generating devices by subjecting them to a common clock as well as identical operating conditions, thereby guaranteeing an identical internal state and synchronized output timing behaviour.

Such devices may ordinarily be construed as being cameras or image sensors but may also be understood as being any electronic device specifically designed to generate video-data. For the sake of clarity and ease of reading, the terms "video source", "video-data generating device", "camera" and "image sensor" may be used interchangeably in this patent without making explicit reference to the full list of alternatives, each time. However, it is to be understood that the same invention applies to any video-data generating device in general This patent discloses an invention which comprises the following three highly related but distinct inventive steps:
1. The invention of a system that combines matched video sources which share a common clock in order to guarantee near-perfect synchronization.
2. The invention and use of a frozen-clock video source programming method to circumvent the problem of synchronization divergence during video source mode changes and initialization routines.
3. The invention of a method which emulates multi-tap cameras to allow high speed transmission of synchronized multivideo over a single standard multi-tap video interface to a video sink such as a frame grabber.

The method here disclosed, not only solves the issue of generating accurately synchronized video signals in a simple and very economical way, but also avoids the need for transferring frame or line synchronizing pulses between video sources making it applicable to systems requiring very high speed operation without posing serious restrictions on the relative positioning of the video sources. This method also avoids the need for a "store and forward" mechanism and hence does not incur any of the complexity and delays associated with internal buffering.

In view of the high quality of the synchronization achieved at the source, a method was also developed and is hereby disclosed which preserves the same degree of high synchronization while transmitting the video sequences over a length of cable. In the preferred embodiment of this invention, a Camera-Link® interface and cable is used. This is taken as an example and is described in further detail.

Synchronized transmission is accomplished by combining the video outputs of the plurality of video sources in a multivision system into a single bundle that mimics the behaviour of a multi-tap camera system. This in turn lends itself to be easily transferred over a single Camera-Link® connection that inherently guarantees synchronized transport of multi-tap video signals.

Terminology

Extensive use of certain terminology will be made in this document. For the avoidance of doubt, and for the purpose of correct interpretation of this patent, this terminology shall be subject to a single precise interpretation in all its uses throughout this patent, as shall be defined hereunder:

Video Signal an electronic or optoelectronic form for describing motion-picture sequences Monovision the result of having one video-data generating device such as a single camera, producing a single motion-picture sequence, within a single system Monovideo the video signal produced by a Monovision system Stereovision the result of combining two video-data generating devices such as two cameras into a single system, where each of the said devices produces a separate motion-picture sequence Stereovideo the combined video signal produced by a Stereovision system Multivision the result of combining N video-data generating devices such as N cameras into a single system, where N is any natural number greater than one and where each of the said devices produces a separate motion-picture sequence Multivideo the combined video signal produced by a Multivision system Matching the process of sorting electronic or optoelectronic devices which are essentially identical except for differing timing parameters, into groups, in relation to the value of the said parameters Matched the outcome of the process of Matching Video Source a device specifically designed to generate video-data, such as a camera Video Sink a device specifically designed to accept video-data, such as a frame grabber Technical Problem High speed multivision applications are on the verge of entering mainstream use. However, higher speed vision implies tougher challenges in order to ensure high synchronisation between all the video sources involved. Classical methods of transferring frame synchronisation pulses between devices are ineffective at very high speeds. Such methods also pose severe restrictions on the relative positioning of the individual video sources.

A second major challenge often encountered in high speed multivision, is the need to simultaneously initialise or re-program all the video sources in the system. This is quite problematic considering that the majority of video sources (such as CMOS image sensors) are configured over relatively slow serial interfaces (often a shared bus). In practice, commands have to be sequentially delivered to each of the video sources and for certain commands this process would invariably result in frame/line phase misalignment between the video signals. Picture tearing is the common result.

The third serious problem is that of faithfully transmitting synchronised multivision data out of the multivision system in a way that is practical and preserves the same level of synchronisation.

Solution to Problem

The use of a common clock has long been recognized as having the potential to partially fulfil the requirements for achieving synchronization between video sources. This is exemplified by the number of patent applications and patents issued over the past decade. However, it is only in the present invention that the problem has been finally and definitively solved. This was achieved through the use of matched video sources subjected to the same operating conditions which is hereby recognized and suggested as the necessary additional step towards completely fulfilling the requirements for achieving near-perfect synchronization. The use of matched devices is vital to the successful implementation of the method and apparatus presently disclosed, and would be likely to fail unless the video sources are carefully selected to have matched performance characteristics.

The process of grouping matched components is well known to those skilled in the art of electronics. This is especially important and commonplace in the field of analogue electronics. In digital electronics the practice is much less widespread and its use in the field of digital cameras and other such complex video sources, is essentially unknown because, so far, there was (generally) no compelling reason to do so. It is nonetheless, obviously possible and can be performed as described in the next paragraph.

Cameras that need to have matching properties can be constructed using components that are themselves carefully selected to be matched. For simple passive components, this is easily specified to the manufacturer who will then sort the components prior to delivery at a small additional cost. For integrated circuits, in particular for the image sensors, a high degree of matching can be easily achieved by selecting components off the same production line in groups that would have been fabricated in the same production run and would preferably have also been in close proximity on the same semiconductor wafer during fabrication. This ensures very similar characteristics which can be exploited to construct cameras with highly similar performance and timing characteristics. Same applies to any video source.

Such video sources can then be combined to share a common clock and, contrary to common accepted practice, they can now be assumed to be sufficiently synchronized to also combine their output asynchronously in a variety of ways. One such way is through the use of a video combiner as described subsequently.

In electronics it was historically considered bad practice to blindly rely on a shared clock, to asynchronously combine the outputs of complex digital circuits, such as cameras, due to large manufacturing process variations. Widely differing timing behaviour would be likely to occur and this could in fact very well result in a variety of logic hazards and race conditions that would, in the end, result in an unintelligible combined output.

However, in course of arriving at this invention, this practice has been reconsidered, and contrary to the conventional teachings of electronics, given the newly widespread availability of much better-controlled manufacturing processes, this practice was affirmed as being valid and is likely to have been avoided by those skilled in the art due to an unfounded technical prejudice. This practice has in fact been conclusively demonstrated both theoretically and empirically by the inventor to be a valid assumption and that it can form the basis for a reasonably reliable design technique and is hereby being applied in a novel way to solve a long-standing problem in the synchronization of multiple digital cameras and video sources in general. This clearly makes the present invention novel, inventive and susceptible of industrial application.

Figure 1:
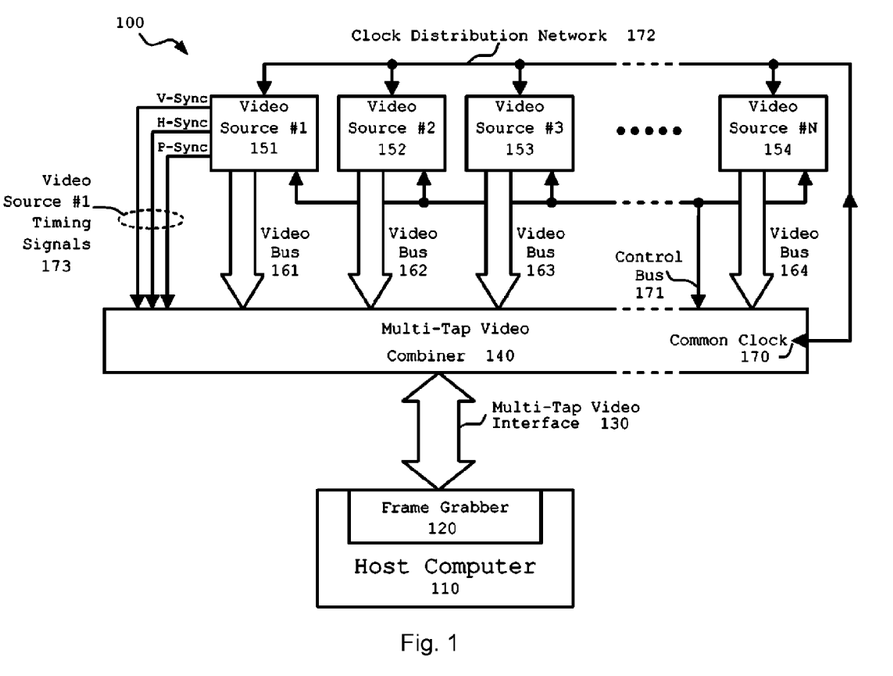
FIG. 1 illustrates a block diagram of a system utilizing the present invention for the synchronization of the internal states and video outputs of multiple video sources (151 . . . 154) and their combination for transmission over a single multi-tap video interface 130 such as Camera-Link®.

Referring now to the drawings there is shown in FIG. 1 a multivision video system 100 that makes use of the preferred embodiment of the present invention. The multivision video system 100 generally comprises a plurality of video sources 151, 152, 153 and 154, a multi-tap video combiner 140, a multi-tap video interface 130, a frame grabber 120, and a host computer 110. Generally, a variable number 'N' of video sources could be present in the multivision video system 100 and where video source '#1' 151 represents the first video source and video source '#N' 154 represents the $N^{th}$ and last video source in the system 100.

The video sources 151, 152, 153 and 154, are here shown sharing a common clock 170 which is provided via a symmetric clock distribution network 172 and controlled by the video combiner 140. The video sources 151, 152, 153 and 154 also share a common control bus 171 through which the multi-tap video combiner 140, can issue commands to alter the behaviour of each of the video sources 151, 152, 153 and 154. The video sources 151, 152, 153 and 154 each produce a video output which is delivered over their unique video buses 161, 162, 163 and 164 to the video combiner 140.

Timing signals are also produced by all the video sources 151, 152, 153 and 154, but only the timing signals 173 produced by the first video source 151, are actually utilized by the video combiner 140. This is the first inventive step that is being disclosed in this patent.

Each of the video sources 151, 152, 153 and 154 may be uniquely addressable, allowing the video combiner 140 to uniquely access the control registers inside of each of the video sources 151, 152, 153 and 154 and hence adjust their behaviour accordingly. This is a hazardous process that could result in loss of synchronization unless special requirements are adhered to. The present invention foresees that the commands be broadly divided into two categories:

Those that are synchronization-safe (such as a change in gain) and hence can be issued to any of the video sources 151, 152, 153 and 154 at any time without disrupting the state of synchronization; and Those that are not synchronization-safe (such as a change in frame rate) and hence can only be issued to all the video sources 151, 152, 153 and 154 at once or not at all, in order to preserve synchronization.

This presents a problem, since the delivery of commands to image sensors and other devices is most often serial and sequential in nature and cannot involve all video sources 151, 152, 153 and 154 at once. The present invention discloses a technique whereby the common clock 170 shared by all the video sources 151, 152, 153 and 154 is halted before sequentially delivering commands that are not synchronization-safe. While the common clock 170 is halted, the multi-tap video combiner 140, programs the new configuration into each of the video sources 151, 152, 153 and 154. Only when this process is complete and all video sources 151, 152, 153 and 154 have matching configurations is the common clock 170 restarted. This has the effect of preserving synchronicity between the video sources 151, 152, 153 and 154 and their internal state in a way which is equivalent to issuing commands to all the video sources 151, 152, 153 and 154 at once. Such a solution requires that the video sources 151, 152, 153 and 154 employ a fully static logic design which allows the clock to be halted and restarted without negative consequences. Most modern CMOS video sources such as image sensors are of this type. This is the second inventive step that is being disclosed in this patent.

The video combiner 140 captures the video data from each video bus 161, 162, 163 and 164 of each video source 151, 152, 153 and 154 and bundles it together with a single set of timing signals 173 to produce a pseudo-multi-tap video signal on the multi-tap video bus 130. This is sent to the Frame Grabber 120 which interprets it a normal multi-tap video signal which is ultimately transferred to the host computer 110. The video data received in this form has an implicit guarantee of synchronization. Each tap corresponds to the output of one of the video sources 151, 152, 153 and 154 making it very convenient to process by most machine vision applications. This is the third inventive step that is being disclosed in this patent.

Advantageous Effect of Invention

The invention, thus described, provides a lower cost but higher performing technique for generating synchronised multivideo. The system is practical and relies only on commonly available resources. Stereovision and multivision systems relying on this invention can benefit from much simplified ability for miniaturisation. Moreover, the technique presents a holistic solution that even preserves synchronisation across mode changes of the video devices. Finally the technique lends itself to a new way for transmitting multivideo over standard interfaces while still preserving the same degree of synchronisation.

BRIEF DESCRIPTION OF DRAWINGS

The novel features and other aspects and advantages of the present invention will become better understood with regard to the following description, appended claims and accompanying drawings, where:

Several items such as power supplies, camera optics, and other necessary video source components have been omitted from the diagrams and the following description to improve clarity and to focus better on the main elements of the current invention. The role of such items will be obvious to anyone with ordinary skill in the art and need not be mentioned explicitly.

DESCRIPTION OF EMBODIMENTS

The most commonly available video sources are of course, cameras. Thus for the best mode of implementation of this invention, cameras will be used as an example. Referring now to the drawing in FIG. 2, there is shown, the architectural detail of a stereovision camera system 200 that makes use of the preferred embodiment of the present invention. The stereovision camera system 200 comprises two cameras 270, 280, a stereovision video combiner 220, a Camera-Link® cable 212, a Camera-Link® frame grabber 211, and a host computer 210.

Figure 2:
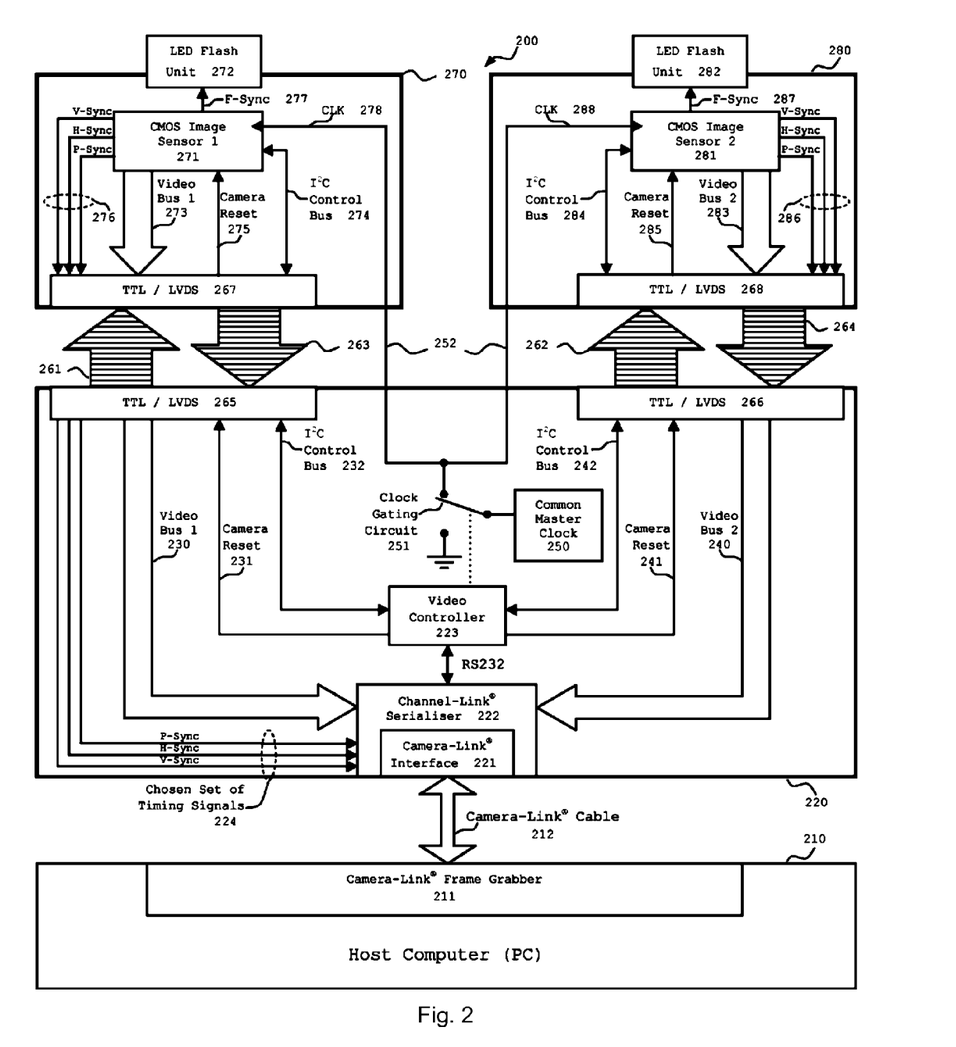
FIG. 2 illustrates a block diagram of the internal architecture of the preferred embodiment of a system utilizing the present invention for the synchronization of the internal states and video outputs of two cameras 270, 280 and their combination for transmission over a single Camera-Link® interface 221.

The cameras 270, 280 are identical in every respect. The left camera 270 is operated as a master while the right camera 280 is operated as a slave. This distinction is merely the result of the way the outputs from the cameras is treated by the video combiner 220. Each camera comprises a CMOS image sensor 271, 281 which triggers an optional LED flash unit 272, 282 using a flash sync pulse 277, 287. The image sensor 271, 281 generates timing signals 276, 286 and drives a video bus 273, 283 while it accepts a clock 278, 288, a control bus 274, 284 and a camera reset signal 275, 285.

The cameras 270, 280 are connected to the video combiner 220 with a high integrity bidirectional LVDS link 261, 262, 263, 264 which carries the video bus 273, 283 and the timing signals 276, 286 towards the combiner 220 and carries the camera reset 231, 241 and control bus 232, 242 towards the cameras 270, 280. TTL to LVDS transceivers 265, 266, 267, 268 at both ends, perform the conversion in both directions.

The video combiner 220 comprises, amongst other things, a common master clock 250, a clock gating circuit 251, a symmetric clock distribution network 252, a video controller 223, a Channel-Link® serialiser 222 and a Camera-Link® Interface 221. The Channel-Link® serialiser 222 takes the two video busses 230, 240 and the Camera-Link® timing signals 224 and serializes them onto four high speed differential serial lines. These are then mapped onto each tap of the Camera-Link® interface 221 as defined by the Camera-Link® standard and finally transmitted over the Camera-Link® cable 212 to the Camera-Link® frame grabber 211. The host computer 210 ultimately receives and de-multiplexes the video data.

The video controller 223 controls the delivery of the common master clock 250 to the cameras 270, 280 over the symmetric clock distribution network 252, by means of a clock gating circuit 251. This clock gating circuit 251, is capable of cleanly interrupting and reconnecting the clock 250 without causing any glitches on the output.

Figure 3:
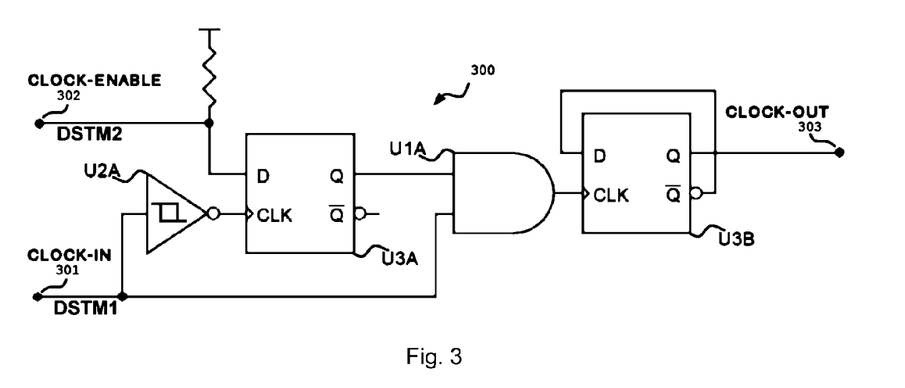
FIG. 3 illustrates an exemplary embodiment of the clock gating circuit 251 mentioned in FIG. 2.

The clock gating circuit 300 whose preferred embodiment is shown in the schematic of FIG. 3, takes a clock 301 and a clock-enable line 302 as inputs. This clock 301 must have double the frequency of what is required by the cameras 270, 280. When the clock-enable line 302 is held at logic low, the AND gate U1A isolates the output D-flip-flop U3B which holds its last held state, interrupting clock transfer. When the clock-enable line 302 is held high, the AND gate U1A relays the clock 301 to the output D-flip-flop U3B which divides the frequency, producing a clean 50% duty cycle output clock signal 303. The negative edge triggered D-flip-flop U3A only conducts changes in the select line to the AND gate U1A at the negative edges of the incoming clock 301 which satisfies set-up time requirements of the output D-flip-flop U3B.

Figure 4:
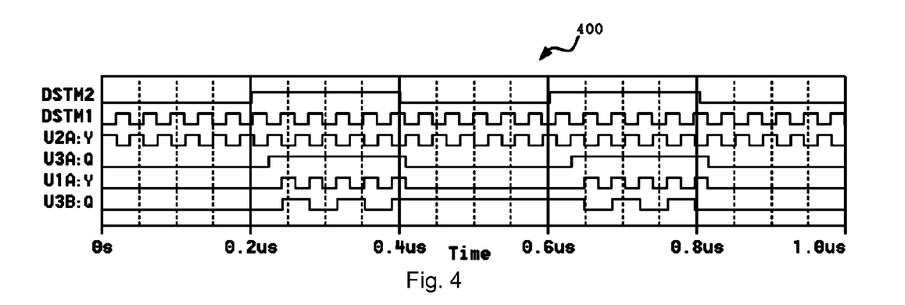
FIG. 4 illustrates the operating and timing behaviour of the exemplary embodiment of the clock gating circuit 300 as illustrated in FIG. 3.

Referring now to the timing diagram 400 shown in FIG. 4, several signals are shown describing the operation in time of the clock gating circuit 300 when supplied with clock signal DSTM1 and clock-enable line signal DSTM2. The U2A:Y output signal shows the inverted clock which is fed into D-flip-flop U3A. The U3A:Q output signal shows the re-synchronized clock-enable line pulse while the U1A:Y output signal shows the gated clock. Finally, the U3B:Q output signal shows the gated output of the circuit after frequency division.

Figure 5:
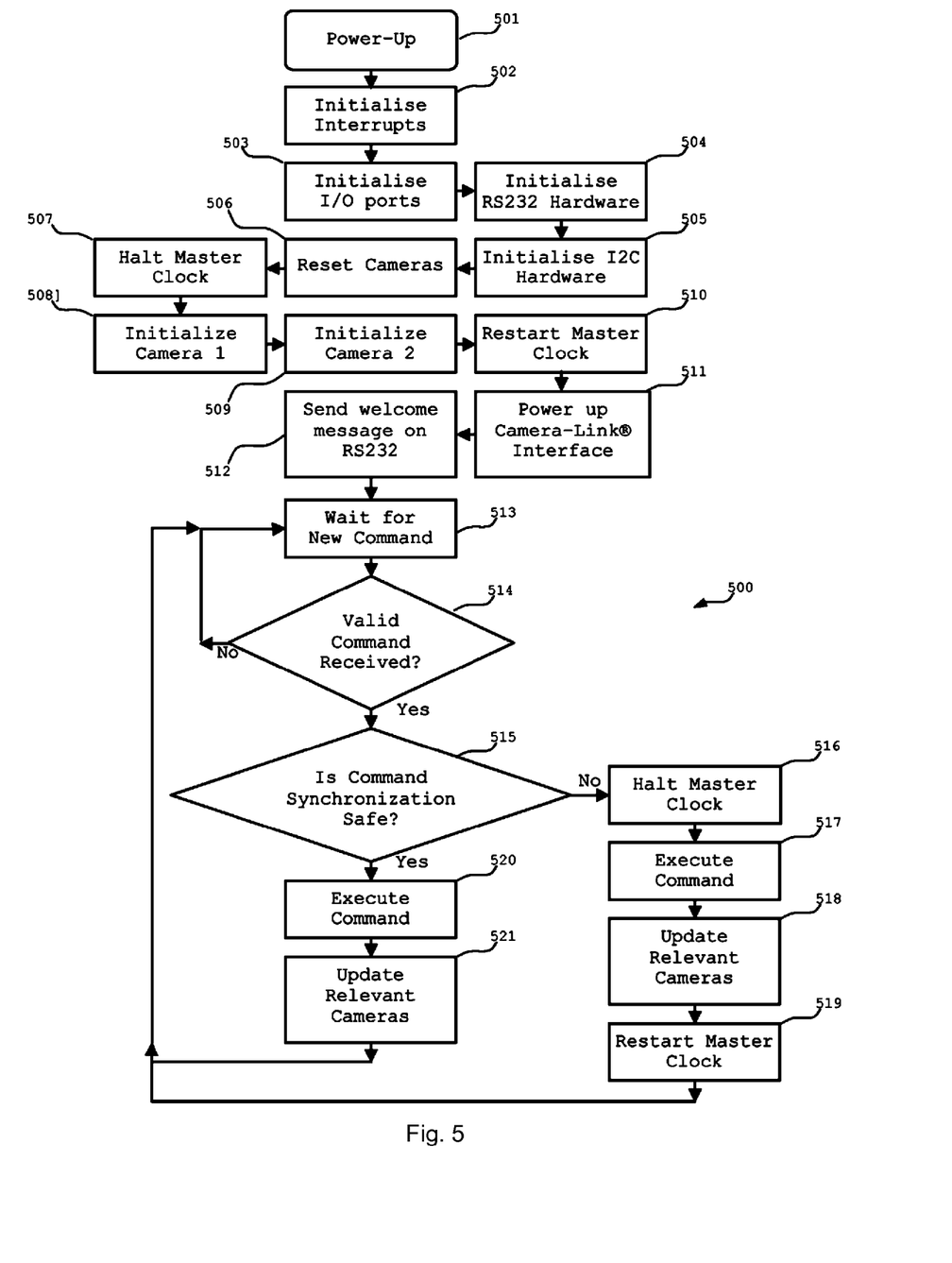
FIG. 5 illustrates a flow chart of the behaviour of the video controller 223 shown in FIG. 2 as applicable to the case when the video sources are digital cameras.

A microcontroller embedded into the video combiner 220 of FIG. 2 which is programmed to execute the flowchart 500 shown in FIG. 5 is the preferred embodiment of the video controller 223 shown in FIG. 2. This flowchart 500 is here described in terms of the stereovision embodiment 200 of the present invention as illustrated in FIG. 2. This flowchart 500 is equally applicable to other embodiments involving more than two cameras. This flowchart 500 describes a novel method for ensuring the preservation of synchronized camera behaviour during the power up sequence and also during any configuration changes performed in the cameras.

After power-up 501 the controller 223 performs an initialization 502 of the interrupts which enables or disables the appropriate interrupts in the microcontroller. Next, the I/O ports are initialized 503 followed by the initialization of the RS232 504 and I²C 505 hardware ports. Next, the cameras 270, 280 are reset 506 by issuing a reset pulse on the dedicated camera reset lines 231, 241. At this point the clock 250 is halted in preparation for the initialization 508, 509 of the two cameras 270, 280. The initialization of the second camera 509 is performed after the initialization of the first camera 508 but this does not pose a problem because the clock 250 is halted 507. Then the clock is restarted 510 and the Camera-Link® interface is powered-up 511. After sending a welcome message over RS232 512 the controller 223 enters into a wait state 513. If a command is received during this time, it is first validated 514 and if it is not found to be valid the controller discards it and re-enters the wait state 513. If the command is on the other hand, valid, the command is accepted and classified 515 depending on whether it is synchronization safe or not. If it is synchronization safe, it is executed 520 and the cameras are updated 521.

If the command is not synchronization safe, the clock is halted 516, the command is executed 517, the relevant registers within the camera are updated 518. And finally the clock is restarted 519.

After completion of command processing, the video controller 223 re-enters the wait state 513 in order to accept new commands.

Other Modes for Carrying out the Invention

Among the several modes for carrying out his invention there are various valid substitutions and alterations that any person skilled in the art may contemplate. These include:
1. An integrated circuit approach where the video combiner, video controller and Camera-Link serialiser are all integrated into a single chip.
2. An FPGA approach where the video combiner, video controller and video interface serialiser are all integrated onto a single FPGA which performs all the functionality.
3. A serially coupled system, where each of the video sources is connected to the video combiner though a serialised link.
4. A system where the video devices are powered directly via their serial interface.
5. A system such as the one described but where instead of Camera-Link, a different interface such as Inova Semiconductors' APIX® or GigaSTAR® or GigaSTAR® DDL is used.

Industrial Applicability

Automotive applications are among the first areas that are likely to benefit most from this invention. Up to 20 machine-vision cameras will be included in future vehicles. In particular, there is a steeply growing interest in the utilisation of multiple cameras within vehicles to augment vehicle HMI for safety, comfort and security.

The incomplete list of automotive applications includes occupant detection, occupant classification, driver vigilance and drowsiness monitoring, road surface condition monitoring, lane departure warning, blind spot warning, collision warning-mitigation or avoidance, vehicle security, parking assistance, traffic sign detection, adaptive cruise control and night vision.

Several of these applications involve the use of stereovision or multivision sets of cameras operating in tandem in order to extend the field of view, to increase diversity and ruggedness (by counteracting optical occlusions) or to allow stereoscopic depth estimation. Many of these applications are also highly dependent on high-speed vision. It is the combination of high-speed vision and precise synchronization that presents the toughest challenge and this is what this invention is set to solve.

Additionally, the use of Camera-Link® in such applications also guarantees high performance during transmission of synchronised multivideo. Within the preferred embodiment of the present invention, a single Camera-Link® interface can contemporarily transfer video from several cameras resulting in substantial savings in the quantity, cost and weight of cables required while still guaranteeing a high level of synchronicity.

Reference Signs List
    References in FIG. 1
    100 General top-level diagram of present invention
    110 Host Computer
    120 Frame Grabber
    130 Multi-Tap Video Interface
    140 Multi-Tap Video Combiner
    151 $1^{st}$ Video Source
    152 $2^{nd}$ Video Source
    153 $3^{rd}$ Video Source
    154 $N^{th}$ Video Source
    161 1st Video Bus
    162 $2^{nd}$ Video Bus
    163 $3^{rd}$ Video Bus
    164 $N^{th}$ Video Bus
    170 Common Clock
    171 Control Bus
    172 Clock Distribution Network
    173 Timing Signals Arising from any One of the Video Sources in the Multivision System
    References in FIG. 2
    200 Best mode embodiment using two cameras
    210 Host Computer System (may be a PC)
    211 Camera Link Frame Grabber
    212 Camera Link Interface Cable
    220 StereoVision Video Combiner
    221 Camera Link Interface on the Video Combiner
    222 Channel Link Serialiser
    223 Video Controller (may be a microprocessor)
    224 Timing Signals for Master Camera
    230 Video Bus from Camera 1
    231 Camera Reset Line to Camera 1
    232 I²C Control Bus to Camera 1
    240 Video Bus from Camera 2
    241 Camera Reset Line to Camera 2
    242 I²C Control Bus to Camera 2
    250 Common Master Clock
    251 Clock Gating Circuit
    252 Clock Distribution Network
    261 Power and Control Connection to Camera 1
    262 Power and Control Connection to Camera 2
    263 Video Data and Synchronisation Connection From Camera 1
    264 Video Data and Synchronisation Connection From Camera 2
    265 TTL to LVDS Transceiver for Camera 1
    266 TTL to LVDS Transceiver for Camera 2
    267 TTL to LVDS Transceiver on Camera 1
    268 TTL to LVDS Transceiver on Camera 2
    270 Camera Module 1
    271 Image Sensor in Camera 1
    272 LED Flash Module in Camera 1
    273 Video Bus in Camera 1
    274 I²C Control Bus in Camera 1
    275 Camera Reset Line in Camera 1
    276 Synchronisation Signals in Camera 1

277 Flash Synchronisation Line in Camera 1
278 Sensor Clock in Camera 1
280 Camera Module 2
281 Image Sensor in Camera 2
282 LED Flash Module in Camera 2
283 Video Bus in Camera 2
284 I2C Control Bus in Camera 2
285 Camera Reset Line in Camera 2
286 Synchronisation Signals in Camera 2
287 Flash Synchronisation Line in Camera 2
288 Sensor Clock in Camera 2
References in FIG. 3
300 Preferred Embodiment of Clock Gating Circuit
301 Clock Input
302 Clock Enable Input
303 Clock Output
U1A "AND" Logic Gate
U2A Inverter Logic Gate
U3A D-Type FlipFlop 1
U3B D-Type FlipFlop 2
References in FIG. 4
400 Clock Gating Circuit Timing Diagram
DSTM1 Test Stimulus: Clock Signal
DSTM2 Test Stimulus: Clock-Enable Line Signal
U2A:Y Inverter Logic Gate Output Signal
U3A:Q D-Type FlipFlop Output Signal
U1A:Y "AND" Logic Gate Output Signal
U3B:Q D-Type FlipFlop Output Signal
References in FIG. 5
500 Frozen-Clock Programming Flow Chart
501 Power-Up Process Block
502 Initialise Interrupts Process Block
503 Initialise I/O ports Process Block
504 Initialise RS232 Hardware Process Block
505 Initialise I$^2$C Hardware Process Block
506 Reset Cameras Process Block
507 Halt Master Clock Process Block
508 Initialize Camera 1 Process Block
509 Initialize Camera 2 Process Block
510 Restart Master Clock Process Block
511 Power up Camera-Link® Interface Process Block
512 Send welcome message on RS232
513 Wait for New Command
514 Valid Command Received? Decision Block
515 Is Command Synchronization Safe? Decision Block
516 Halt Master Clock Process Block
517 Execute Command Process Block
518 Update Relevant Cameras Process Block
519 Restart Master Clock Process Block
520 Execute Command Process Block
521 Update Relevant Cameras Process Block
Citation List
Patent Literature
U.S. Pat. No. 5,307,168 A (SONY ELECTRONICS INC.) 26.04.1994
U.S. Pat. No. 5,903,308 A (ULTRAK INC.) 11.05.1999
U.S. Pat. No. 5,995,140 A (ULTRAK INC.) 30.11.1999
U.S. Pat. No. 6,340,991 B (AT&T CORP.) 22.01.2002
U.S. Pat. No. 7,411,604 B (DEUTSCHE TELEKOM AG) 12.08.2008
U.S. Pat. No. 7,511,764 B (COOPER ALAN NEAL; FRITZ CHRISTOPHER MICHAEL; EXNER JAMES WALTER) 31.03.2009
Non-Patent Literature
AIA. Camera Link® Specification Version 1.2. *The Automated Imaging Association*. 2006.
LUHMANN, et al. Synchronous 3-D High-Speed Camera with Stereo-Beam Splitting. *SENSOR* 2005 *Conference, Nurnberg*. May 2005.
LIN, Chang Hong, et al. A case study in clock synchronization for distributed camera systems. *Proceedings of the IEEE*: 0277-786X. March 2005, vol. 5683, no. 1, p. 164-174.
LAMPORT, Leslie. Time, clocks, and the ordering of events in a distributed system. *Communications of the ACM*: 0001-0782 July 1978, vol. 21, no. 7, p. 558-565.
LIN, Chang Hong. Design and implementation of distributed real-time camera systems. PhD edition. Edited by WOLF, Wayne H. New Jersey, 08544, USA: Princeton University, 2007. p. 192.

Claims Preamble

Various embodiments of the present invention will be useful in many diverse stereovision and multivision imaging applications. The preferred embodiment of the method and apparatus of the present invention has been illustrated in the accompanying drawings and described in the foregoing detailed description. However, it is understood that the invention is not limited to the specific embodiment disclosed, but is capable of numerous rearrangements, modifications and substitutions by persons with ordinary skill in the art, without departing from the domain of the present invention. All such modifications and variations will be deemed to be within the scope of the present invention if defined by the following claims:

The invention claimed is:

1. A system or apparatus for producing synchronized digital video data, comprising:
    a plurality of digital video sources consisting of cameras or image sensors, wherein each is arranged to produce a fraction of the said synchronized digital video data;
    a clock adapted to set a time period for sampling the synchronized digital video data;
    a clock distribution subsystem through which the video sources are operably coupled to the clock and adapted to communicate and share the clock between each video source, exhibiting a symmetric delay in transferring the clock to each video source, wherein the video sources are also matched so that they will continue to possess an internal state which is identical in all the video sources, which are therefore synchronized, and will hence exhibit identical behaviour over time, if subjected to equivalent conditions at all times; and
    a video controller arranged to intercept, filter, sort or marshal all configuration commands directed towards any of the video sources, by halting or disconnecting the clock and restarting or re-connecting the clock, so as to ensure that no such command reaches any of the video sources in a way which upsets the synchronized internal states of the said video sources.

2. The system or apparatus as set forth in claim 1, wherein the clock distribution subsystem is physically symmetric.

3. The system or apparatus as set forth in claim 1, which additionally comprises:
    a plurality of digital video busses equal in number to a number of digital video sources, where each bus is operably coupled to one corresponding video source, at one end, in order to carry the corresponding, relevant fraction of the said synchronized digital video data; and
    a digital video combiner which is operably coupled to each of the video busses at their other end,
    wherein
    the video combiner receives the synchronized digital video data from each video source; and timing pulses from each of the video sources are synchronized and the video combiner may therefore, optionally, discard the synchronized timing pulses from all video sources, except for one, without any significant loss of synchronization information.

4. The system or apparatus as set forth in claim 1, which additionally comprises:
- a means for halting or disconnecting the clock which is being shared by the plurality of digital video sources; and
- a means for restarting or re-connecting the clock which is being shared by the plurality of digital video sources.

5. The system or apparatus as set forth in claim 4, wherein:
the means for halting or disconnecting is arranged to halt or disconnect the clock being shared by the plurality of digital video sources before sequential or asynchronous delivery of commands to the said plurality of video sources; and
the means for restarting or connecting is arranged to restart or reconnect the clock being shared by the plurality of digital video sources after the sequential or asynchronous delivery of the said commands to the said digital plurality of video sources.

6. The system or apparatus as set forth in claim 1, wherein the said video controller is arranged to distinguish between commands that could affect synchronization from commands that cannot affect synchronization between the plurality of digital video sources.

7. A system or apparatus as set forth in claim 6, further arranged to transfer the synchronized digital video data to a video sink, which accepts multi-tap video, system or apparatus further comprising:
- a multi-tap video interface capable of communicating multi-tap video data between a video source and a video sink; and
- a video combiner arranged to supply a combined video signal to the multi-tap video interface for transfer to the video sink.

8. The system or apparatus as set forth in claim 3, wherein the video controller is arranged to strip the synchronized digital video data of each of their pixel and line and frame synchronization signals and then to combine the synchronized digital video data with a single set of pixel and line and frame synchronization signals to provide a combined video signal having the same format as the video signal produced by a multi-tap camera.

* * * * *